United States Patent
Chou et al.

(10) Patent No.: US 8,824,812 B2
(45) Date of Patent: Sep. 2, 2014

(54) METHOD AND APPARATUS FOR DATA COMPRESSION USING ERROR PLANE CODING

(71) Applicant: Mediatek Inc., Hsinchu (TW)

(72) Inventors: Han-Liang Chou, Hsinchu (TW); Tung-Hsing Wu, Chiayi (TW); Kun-Bin Lee, Taipei (TW); Chi-Cheng Ju, Hsinchu (TW)

(73) Assignee: Mediatek Inc, Hsinchu (TW)

( * ) Notice: Subject to any disclaimer, the term of this patent is extended or adjusted under 35 U.S.C. 154(b) by 94 days.

(21) Appl. No.: 13/633,182

(22) Filed: Oct. 2, 2012

(65) Prior Publication Data

US 2014/0092986 A1 Apr. 3, 2014

(51) Int. Cl.
*G06K 9/36* (2006.01)
*H04N 7/50* (2006.01)

(52) U.S. Cl.
CPC ...................................... *H04N 7/50* (2013.01)
USPC ............ 382/232; 382/233; 382/238; 382/239

(58) Field of Classification Search
CPC . H04N 1/00; H04N 2005/00; H04N 2101/00; H04N 2213/00; H04N 7/50; H04N 7/30; H04N 7/26244; H04N 7/26313; H04N 7/26106; G03G 21/1628; G03G 5/00; G03G 2215/00; G03G 2217/00; G06K 15/025; G06K 15/027; G06K 9/036; G06K 9/4638; G06K 9/56; G06K 9/60; G06T 7/0002; G06T 9/004; H04L 45/28; H04L 63/20; G11B 20/00007; G06F 9/5072

USPC ............ 382/232, 233, 238, 239; 375/240.08, 375/E7.079, E7.04, E7.088, E7.129; 369/124.06; 358/404, 448
See application file for complete search history.

(56) References Cited

U.S. PATENT DOCUMENTS

| | | | | |
|---|---|---|---|---|
| 5,757,965 A | * | 5/1998 | Ohki | 382/232 |
| 5,892,847 A | * | 4/1999 | Johnson | 382/232 |
| 6,233,279 B1 | * | 5/2001 | Boon | 375/240.08 |
| 6,453,073 B2 | * | 9/2002 | Johnson | 382/239 |

OTHER PUBLICATIONS

Radha et al., "The MPEG-4 fine-grained scalable video coding method for multimedia streaming over IP", IEEE Transactions on Multimedia, pp. 53-68, vol. 3, No. 1, Mar. 2001.

* cited by examiner

*Primary Examiner* — Anh Do
(74) *Attorney, Agent, or Firm* — Blairtech Solution LLC

(57) ABSTRACT

A method and apparatus of image data compression and decompression are disclosed. According to an embodiment of the present invention, the compression method partitions the image data into access units and encodes each access unit into a bitstream according to a target bit budget. Each access unit is encoded using first data compression to generate a first bitstream and the residual data is further encoded using second data compression to generate a second bitstream if the first bitstream is smaller than the target bit budget. In one example, the second data compression comprises bit plane coding applied to bit plane-ordered data, wherein the bit plane-ordered data is generated by scanning from a most significant bit to a least significant bit of the residual data in a bit plane-wise order. The decompression method comprises steps to recover reconstructed data from the first and second bitstreams.

23 Claims, 6 Drawing Sheets

METHOD AND APPARATUS FOR DATA COMPRESSION USING ERROR PLANE CODING

FIELD OF THE INVENTION

The present invention relates to video data compression and decompression. In particular, the present invention relates to method and systems of using error plane for lossy data compression with limited bit budget.

BACKGROUND

Data compression has become an increasingly important technology in image and video coding systems to exploit data redundancy. One important benefit of data compression is the reduction in the requirement of external memory size, which in turn reduces the cost of overall system. Another benefit of data compression lies in the fact that the reduction in data size may potentially lower the requirement of access bandwidth to external memory, thereby reducing system cost by using dynamic random-access memory (DRAM) with lower access frequency. To obtain better compression ratio (defined as the ratio of the compressed data size to the original data size in this disclosure), lossy data compression methods are usually employed when certain quality loss of the data is acceptable. Lossy data compression for image data has been widely adopted and formed by international coding standards, such as JPEG.

Conventional data compression techniques, such as JPEG, usually encode data based on frames. The smallest coding unit of frame-based compression technique is typically 8×8 or 16×16, which limits the application of these algorithms to systems that have smaller access units with flexible sizes. The smaller size of access units (AUs) is particularly important for the algorithm to be implemented in hardware systems. When data compression is implemented in hardware system at higher data rates, smaller access units with sizes such as 8×1, 16×1, 32×1, 4×4, or 8×8, etc., allow simpler compression methods and more flexible configurations, while the compression of different AUs can be independently calculated. Therefore a smaller AU size helps parallel processing and becomes particularly suitable for hardware implementation.

Another challenge of frame-based compression technique is that the bitstream size of compressed data varies based on the input data. In many image and video related applications, there is a need to access specific image/video data. For example, a selected small area of a JPEG-compressed image may have to be displayed or a block in a previous picture may have to be accessed for motion compensation. Any frame-based or large image-area based compression may have to access and process a large amount of compressed data before the desired video data can be accessed. This will cause more power consumption and inefficient DRAM bandwidth usage in hardware implementation. The memory access and power consumption issues may be alleviated by using smaller AUs. However, certain amount of remaining bit budget for each AU may be left unused due to this variation associated with typical lossy compression. In video and image encoding systems, it is desirable to develop a data compression scheme to realize high compression efficiency (i.e., low compression ratio) based on small access units and at the same time to use the full output bit budget effectively.

BRIEF SUMMARY OF THE INVENTION

A method and apparatus of image data compression are disclosed. According to an embodiment of the present invention, the method partitions the image data into access units and encodes each access unit into a bitstream according to a target bit budget. Each access unit is encoded using first data compression to generate a first bitstream and the residual data is further encoded using second data compression to generate a second bitstream if the first bitstream is smaller than the target bit budget. In one example, the second data compression comprises bit plane coding applied to bit plane-ordered data, wherein the bit plane-ordered data is generated by scanning from a most significant bit to a least significant bit of the residual data in a bit plane-wise order. The first N bits of the bit plane-ordered data is used as the second bitstream, wherein N is an integer corresponding to a second difference between the size of the first bitstream and the target bit budget for the access unit. Each sample of the residual data can be represented by sign and magnitude, wherein the sign is represented by one sign bit and the magnitude is represented by one or more magnitude bits. Furthermore, if said one or more magnitude bits contain one "1" bit, the sign bit is inserted after a first "1" bit of said one or more magnitude bits corresponding to the sample, wherein said one or more magnitude bits with inserted sign bit is used as a binary representation for the sample; and otherwise said one or more magnitude bits corresponding to the sample is used as the binary representation for the sample.

A method and apparatus of image data decompression are disclosed. According to an embodiment of the present invention, the method receives a bitstream associated with an access unit of an image, wherein the bitstream comprises a first bitstream, and wherein the bitstream further comprises a second bitstream according to a condition of the first bitstream. The first bitstream is decoded using first data decompression to generate first reconstructed data corresponding to the access unit. If the second bitstream exists, the second bitstream is decoded using second data decompression to generate second reconstructed data, wherein the second reconstructed data corresponds to residual data, which corresponds to differences between original image data of the access unit and the first reconstructed data of the access unit. The first reconstructed data and the second reconstructed data are then combined to generate final reconstructed data for the access unit if the second bitstream exists. Otherwise, the first reconstructed data is used as the final reconstructed data for the access unit. In one embodiment, the decoding method comprises steps to decode second bitstream encoded using bit plane coding.

DETAILED DESCRIPTION OF THE INVENTION

Traditional highly efficient data compression methods often result in variable size output streams, leaving some unused output bits due to limited bit budget. The remaining bit budget from AU compression can be used to further improve the restored image quality according to embodiments of the present invention. By utilizing the remaining bit budget in the compressed AU bitstream to transmit more coded information of the image/video data, the image/video quality may be improved. A challenging problem hereby is to effectively use the remaining bitstream of each AU which has variable length. Error plane coding (EPC) is introduced in the present invention to effectively encode the residue of each AU in the remaining stream.

In an exemplary application, the lossy data compression may be for frame or image buffer compression with fixed compression ratio to fit into given size of external DRAM. The stream size compression budget in AU-based data compression systems is usually enforced by limiting the output bitstream size of each individual AU independently to simplify the system implementation as well as to provide the random accessibility to any of the AUs. For example, a compression budget of 0.5× of original size may be targeted at each AU, whose size is designed to be compressed to less than or equal to half of the original size. The compressed data size for each AU may vary depending on characteristics of the input data and selected compression parameters such as quantization index. This variation makes it difficult to generate output bitstream size precisely equal to the designed bit budget. To ensure that the output stream size will not exceed the budget even in the worst situation, the compression of each AU is usually designed very conservatively so that the output stream size is always smaller than the budget. Consequently, the output for the AU often still have remaining bit budget.

Figure 1:
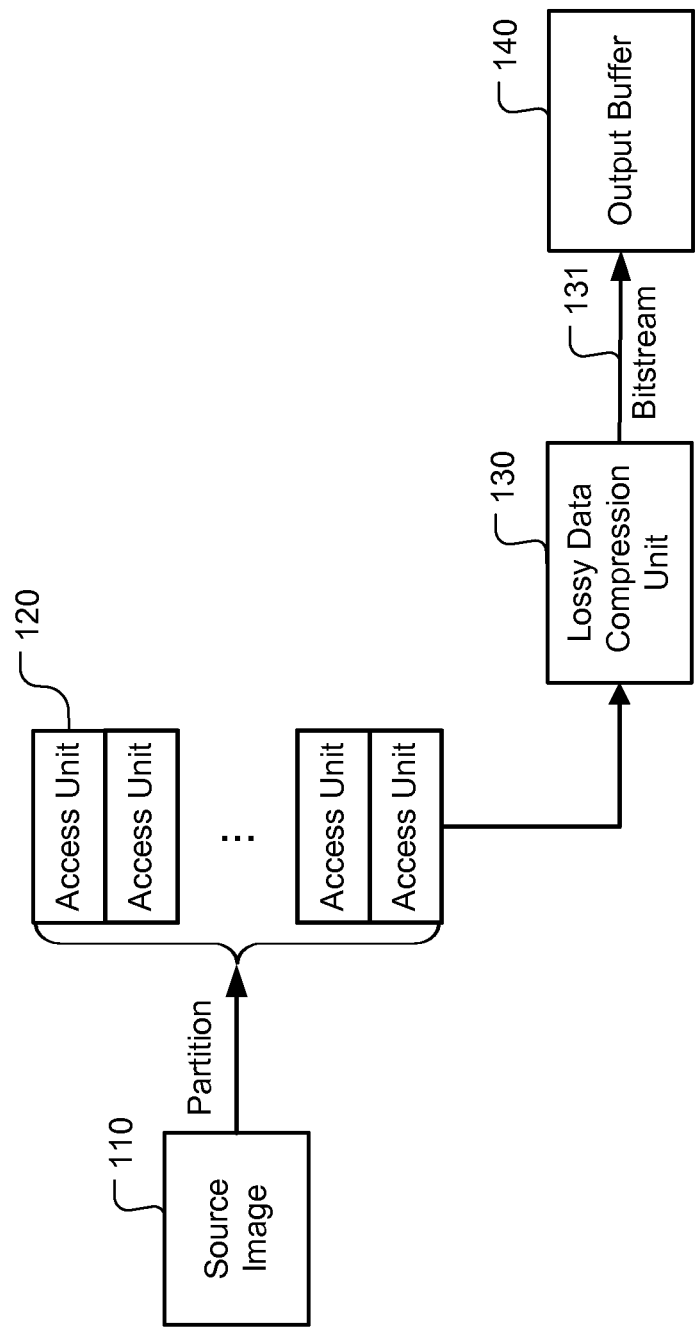
FIG. 1 illustrates an exemplary flow chart of lossy data compression technique based on small access units.

FIG. 1 illustrates a lossy data compression process based on access units. Source image 110 is partitioned into multiple access units 120. Each access unit 120 is then compressed by lossy data compression unit 130, targeting at a compression ratio. For example, an access unit may contain 16 bytes and be targeted to be compressed into less than or equal to 8 bytes for a targeted compression ratio of 0.5. The output bitstream of lossy compression in turn is input into an output buffer 140 to temporarily store one or more compressed access units before the compressed data is transferred to external DRAM.

In the present invention, a two-step compression scheme is developed to fully utilize the output bit budget and improve quality of data compression. The first step is to apply a compression method to each of the multiple independent access units. In this step, the data of each AU is compressed to bitstream size equal to or lower than the output bit budget. In order to guarantee that the compressed data is within the targeted budget, coding parameters associated with compression method may have to be adjusted. The second step is to apply another method to use the remaining bit budget to improve compression quality. Desired compression ratio can be guaranteed by properly selecting coding parameters in the first step, while the second step will generate a fixed size output bitstream by filling remaining bits with residue information.

Figure 2:
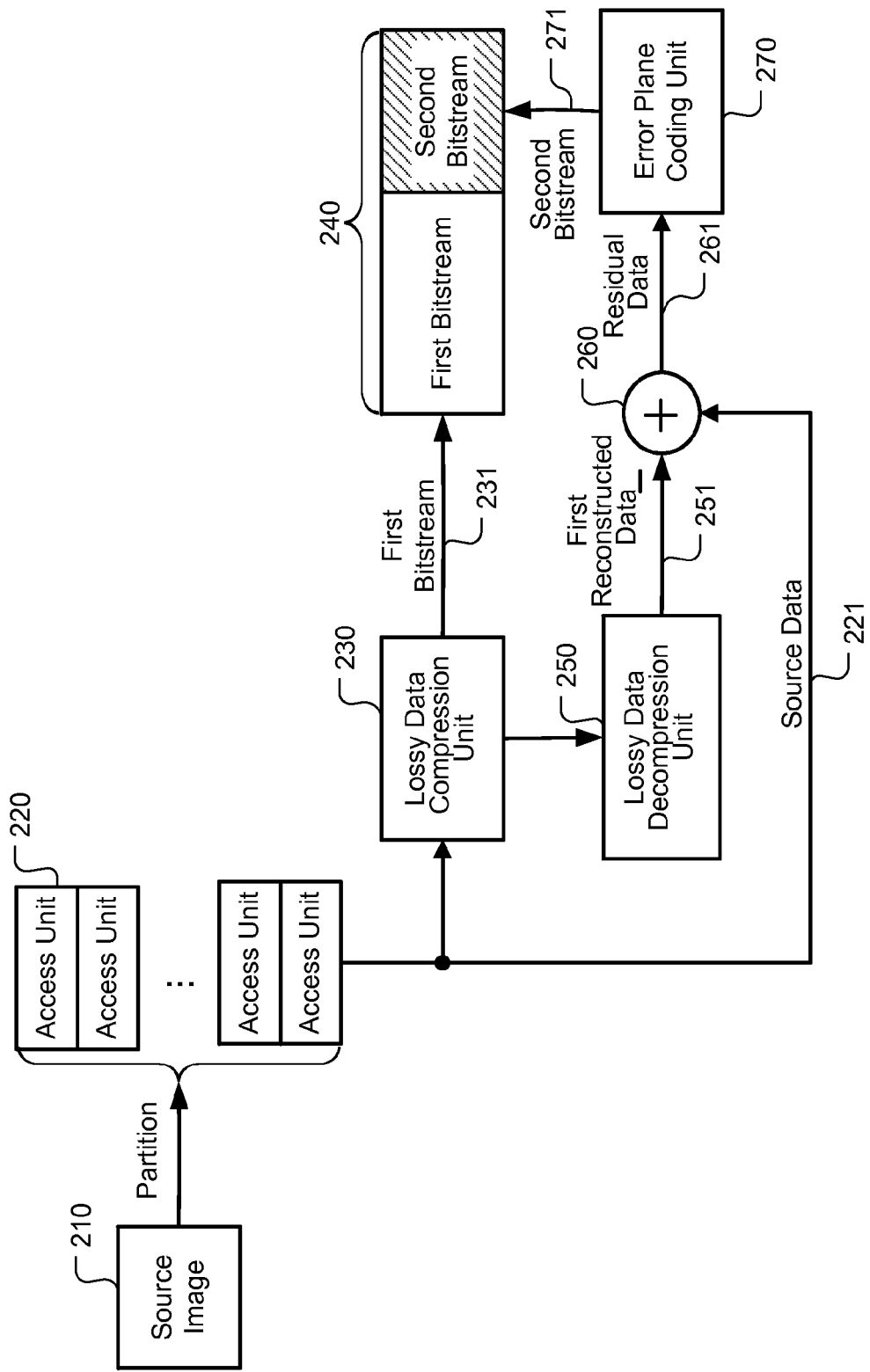
FIG. 2 illustrates an exemplary flow chart of lossy data compression technique based on access unit with limited bit budget of output buffer, where error plane coding method is implemented to improve the quality of reconstruction image.

FIG. 2 illustrates an exemplary system incorporating an embodiment of the present invention, where a seconding coding method is applied to code the residual data using the remaining bits for each AU. Source image 210 is partitioned into multiple access units, such as 8×1, 16×1, 32×1, 4×4 or 8×8, etc. Each access unit 220 is compressed by a lossy data compression unit 230 to generate a first bitstream 231, which is in turn stored in an output buffer 240. Given a targeted compression ratio r, for example r=0.5, the target output bit budget x for each 8×1 AU is then 32 bit (assuming 8 bit per pixel, 64 bit per AU in this case). There are various lossy data compression techniques known to skilled person in the art, such as transform coding and wavelet coding. These coding techniques usually include entropy coding such as variable length coding or arithmetic coding. Therefore, the details of lossy coding techniques are not described here. If a lossy data compression generates y bits for the AU, this results in remaining (x−y) bits available for the second coding method. For example, the lossy data compression for an AU may generate 28 bits, thereby leaving a 4 bit remaining budget. However, if the first bitstream is equal to the target bit budget, i.e., (x−y)=0, it implies that there is no remaining bit left for the second data compression. Therefore, the second data compression is not performed in this case.

In order to take advantage of the remaining bit budget from the first step, the residues of the lossy compression, which is also called error data, is first obtained by subtracting the reconstructed AU from the original AU. The combiner 260 is used to subtract the first reconstructed data 251 from the source data 221 to form the residual data 261. A lossy data decompression unit 250 is used to recover the first reconstructed data 251. The residues are then encoded using a second coding method into a second bitstream 271. An error plane coding unit (EPC) 270 is shown in FIG. 2 as an exemplary second coding method. The EPC according to the present invention can generate coded bits that precisely fit the targeted bit budget. Both the first bitstream 231 and the second bitstream 271 can be stored in an output buffer 240 before the compressed data is transferred to external memory.

Figure 3:
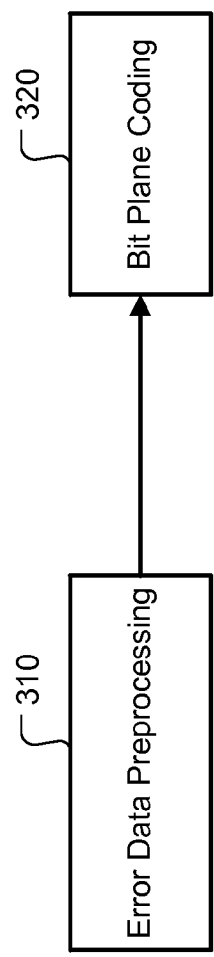
FIG. 3 illustrates an exemplary flow chart of error plane coding technique including error data preprocessing and bit-plane coding.
Figure 4:
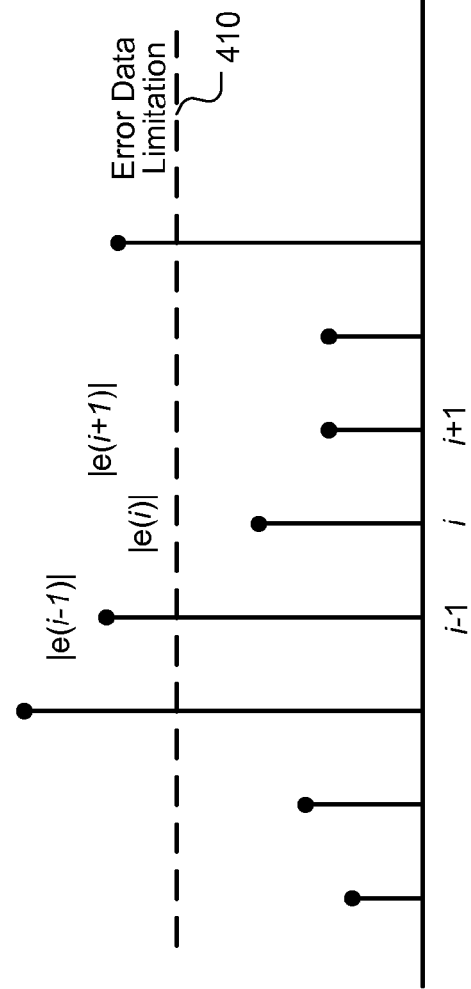
FIG. 4 illustrates an example of error data preprocessing by limiting the bit depth of error plane.

The error plane coding unit (EPC) 270 is used to encode the residual data as shown in FIG. 2. In some cases, the first data compression may result in lossless compression, where the residual data are all zeros. In the case, there is no need to apply the second data compression. The case of lossless compression can be indicated by a syntax element in the first bitstream. For example, the quantization index may be set to 0 to indicate that the first data compression is lossless. Accordingly the second data compression may be skipped to reduce power consumption in this case. If the second data compression is applied, the EPC processes the residual data by dropping from the least significant part to the most significant part on a bit plane-wise fashion. Accordingly, the EPC can precisely control the bitstream size to meet the bit budget. An example of EPC is shown in FIG. 3, where the EPC process comprises error data preprocessing 310 and bit-plane coding 320. Error data preprocessing is introduced to process and prepare the error data more suited for the subsequent coding in order to improve the coding efficiency and/or improve the coding quality. The error data may have wide dynamic range and/or may be represented in large bit depth which will cause the subsequent bit plane-wise coding very inefficient. The preprocessing, incorporating an embodiment according to the present invention reduces the dynamic range of the error data, is to use data clipping as shown in FIG. 4, where |e(i)| refers to the absolute value of error data e(i) at pixel location i. An error data limitation, Thr may be selected to clip the error data so that e(i)=Thr if e(i)≥Thr and e(i)=−Thr if e(i)≤Thr. The error data may be represented by one sign bit and n-bit magnitude. For example, if the error limitation, Thr is set to 1, the error magnitude will be limited to 0 and 1 (i.e., 1-bit representation). Accordingly, the error data will be represented by 0, +1, or −1. Similarly, if Thr is set to 3, the error magnitude will be limited to 0, 1, 2 and 3 (i.e., 2-bit representation). While data clipping is used as an example of error data preprocessing, other preprocessing means may also be used. For example, quantization or rounding may also be used to reduce the number of bits used to represent the error data, instead of clipping. In yet another example, data filtering such as median filter may also be applied to the error data to prepare the data for subsequent coding. Furthermore, a combination of the preprocessing means may also be used. For example, a median filter can be applied to the error data and followed by the clipping mentioned above.

After the preprocessing of residue data, bit-plane coding (BPC) is used to encode the preprocessed error data. The bit-plane coding arranges data from the most significant bit (MSB) to the least significant bit (LSB) to generate a bit plane-ordered data (from high priority to low priority). The bit-plane coding selects the output bit plane-wise from high priority to low priority bits. In other words, the bit-plane coding selects the output from the MSB of the first sample, then to the MSB of the second sample, . . . , to the MSB of the last data, then continue to the MSB-1 bit of the first sample, then the MSB-1 bit of the second sample, and so on. The LSB of the last data will be the last bit of bit plane coding. This bit plane-ordered data will be truncated to fit into the remaining bit budget. During the truncation of the bit plane-ordered data (abbreviated as ordered data hereafter in this disclosure), the bits from the MSB of the first sample data to the LSB of the last sample data in bit plane-wise order that can fulfill the remaining bit budget are retained as the second bitstream, while the rest of the ordered data is disregarded. FIG. 5A illustrates an example of ordered data generation according to an embodiment of the present invention. In FIG. 5A, the preprocessed error data corresponds to an AU with 3 samples, where bit depth of error data magnitude is 2. The magnitude of preprocessed error data at pixel i is represented by $B_{i,j}$, where j=0, . . . , (M−1) and M corresponds to the bit depth for the error data magnitude. Accordingly, the two magnitude bits of preprocessed first sample is shown as $B_{1,1}$ (which is the MSB) and $B_{1,0}$ (which is the LSB). The ordered data is generated by scanning from first MSB of the first data to the LSB of the last data along the bit plane as indicated by the arrows illustrated in FIG. 5A. Therefore, the ordered data for the example in FIG. 5A is $\{B_{1,1}, B_{2,1}, B_{3,1}, B_{1,0}, B_{2,0}, B_{3,0}\}$.

One embodiment of BPC of the present invention represents the error data using sign and magnitude. While fitting the ordered data corresponding to the magnitude part of the error data into the remaining bit budget, the sign part of the error data also has to be taken into account. A coding means for the sign part of the error data according to an embodiment of the preset invention inserts the corresponding sign bit when a "1" bit for the magnitude of an error data is first time included for the second bitstream. The sign bit can be inserted when converting each error data into a binary representation for each error data, where the sign part is inserted immediately after the "1" bit of the error data. For example, sign bit for positive data is encoded as bit "0", while negative sign as bit "1". A sample of value "−4" has a sign bit "1" and magnitude "4". The magnitude can be encoded by normal binary presentation. Therefore the magnitude is represented by "100" if 3-bit bit depth is used. The sign bit (i.e., "1") is inserted right after the first non-zero ("1") bit of the binary represented magnitude. Therefore, a value of "−4" results in the sign inserted representation "1100" according to the present invention. During bit-plane coding, bits of each data sample is encoded from MSB to LSB bit plane-wise. The first "1" bit and its following sign bit is considered as one instance during bit plane-wise scanning, where the following sign bit should be always included in the BPC bitstream when the associated first "1" bit is included in the BPC bitstream. It is also understood that the sign bit definition described above can be implemented in the inverse manner where positive sign is noted as "1" and negative sign as "0" without changing the rest of the process. The above example illustrates an example of incorporating the sign part using bit plane-wise along with the magnitude part. A person skilled in the art may use other means to insert the sign bit plane-wise to practice the present invention. For example, the sign bit for each error data may be stored along with the magnitude of the error data at a predetermined location (such as at the beginning or the end of the magnitude binary data) or separately from the magnitude of the error data. When the first "1" bit of the error data is included for the BPC bitstream, the associated sign bit is inserted immediately after the first "1" bit for the error data. After both sign and magnitude of the error data are coded to fill up the remaining bit budget, the resulted bit-plane coded bitstream (i.e., the second bitstream) is combined with the output bitstream of the lossy compression (i.e., the first bitstream) to form the final output bitstream. Furthermore, other sign-magnitude based binary representations may also be used to practice the present invention. For example, the bits for magnitude according to a conventional binary representation (e.g., 5->"101" and 3->"011" for bit depth of 3) can be inverted bit by bit (e.g., 5->"010" and 3->"100") and the sign bit can be inserted after the first "0" bit. This will result in equivalent effect as using a conventional binary representation described above.

Figure 5B:
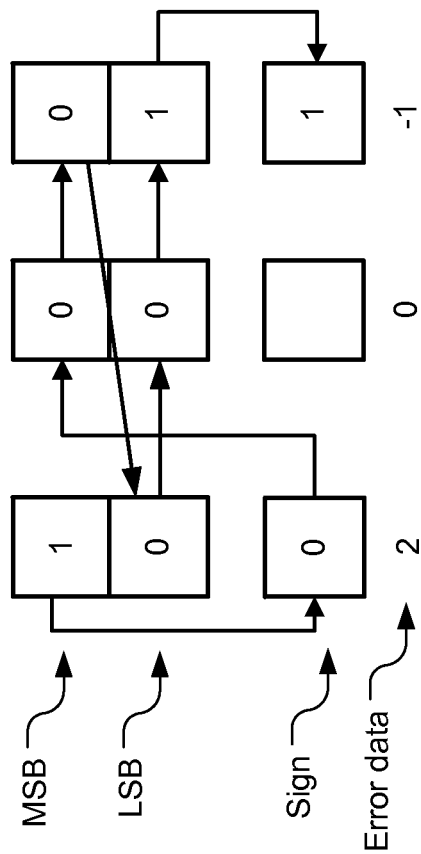
FIG. 5B illustrates an example of bit-plane coding according to an embodiment of the present invention, wherein the error plane has 3 samples "2, 0, −1" and the error magnitude bit depth is 2.
Figure 5A:
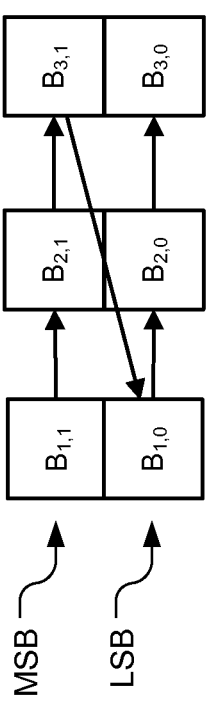
FIG. 5A illustrates an example of error plane coding method according to the present invention by coding residual data from most significant bit (MSB) to least significant bit (LSB).

FIG. 5B illustrates an example of bit-plane coding of magnitude and sign bits, where the AU consists of three error samples corresponding to "2", "0" and "−1" and bit depth for the magnitude is 2. According to one embodiment mentioned above, the three error samples will be first encoded as "1, 0(s), 0", "0, 0" and "0, 1, 1(s)", where the bits followed by "(s)" indicate sign bits. Furthermore, a first "1" bit and its following sign bit are underlined to emphasize that the sign bit should be included in the BPC bitstream when the first "1" bit is included in the BPC bitstream. Next step is to scan the error samples from the MSB to the LSB and insert the sign bit after the first non-zero ("1") bit of the magnitude of a corresponding error data. Accordingly, the resulted bitstream is {1, 0(s), 0, 0, 0, 0, 1, 1(s)}. If the remaining budget is 5 bit, then the second bitstream is the first five bits, i.e., {1, 0(s), 0, 0, 0}. The last 3 bits, i.e., {0, 1, 1(s)} are disregarded. If the first "1" bit is included in the BPC bitstream and no more remaining bit after that is available to include the following sign bit, the first "1" bit and the following sign bit should be disregarded. In this case, the first "1" bit does not need to be included in the BPC, or if it is included in the BPC bitstream, it should be disregarded by the decoder.

Figure 6:
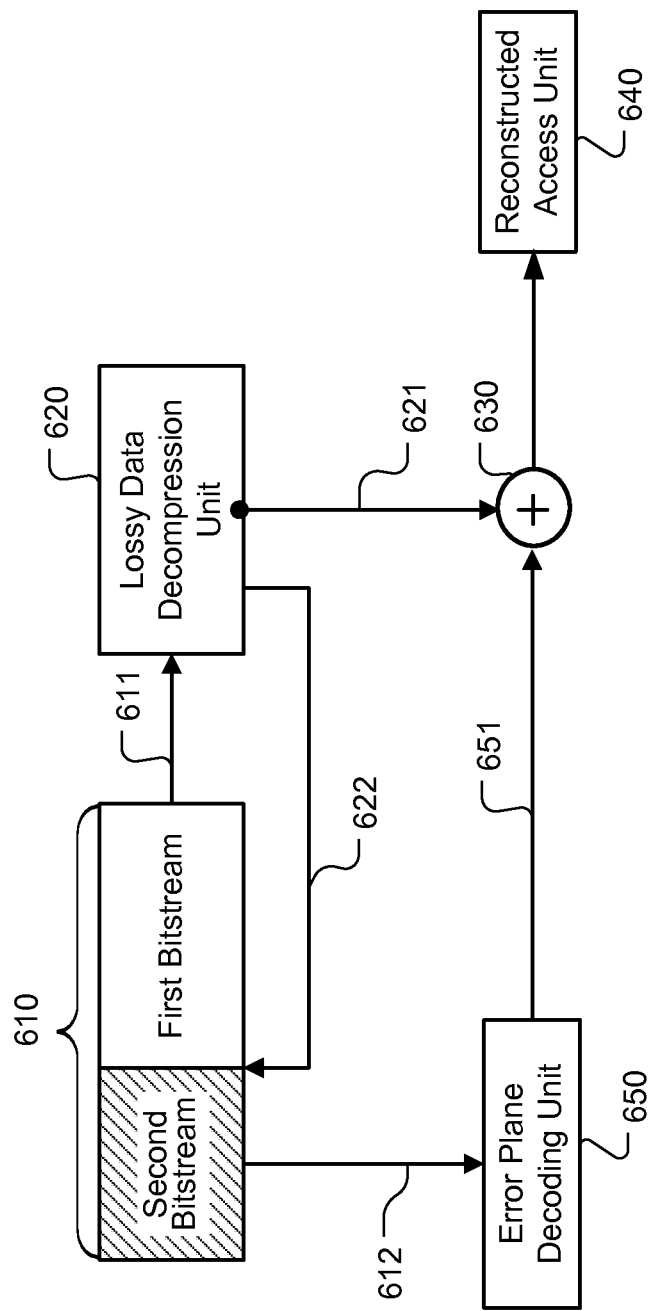
FIG. 6 illustrates an exemplary flow chart of data decompression technique based on access units with limited bit budget, wherein error plane decoding method is implemented to improve quality of reconstructed data.

A decoder for decoding the EPC-compressed bitstream according to an embodiment of the present invention is illustrated in FIG. 6. The input buffer 610 of decoding unit contains data of the first bitstream and the second bitstream. The first bitstream 611 is decoded by lossy data decompression unit 620 to provide the first reconstructed data 621. Since the first bitstream is variable-length coded, the size of the first bitstream is not fixed. Depending on the variable length coding technique used, the delimiter between the first bitstream and the second bitstream may not be known until the first bitstream is decoded. For example, the end of the first bitstream may be determined when all data from an access unit are decoded. According to one embodiment of the present invention, the lossy data decompression unit 620 can determine the size of the first bitstream after the lossy data decompression unit 620 decodes the first bitstream. The size information of the first bitstream (or the end of the first bitstream information) 622 is used to identify the second bitstream. Alternatively, a symbol corresponding to EOB (End of Block) may be used to indicate the end of the first bitstream. In some cases, the system may afford to use a unique codeword as a delimiter between the first bitstream and the second bitstream. Consequently, the second bitstream can be identified without decoding the first bitstream, and concurrent decoding of the first bitstream and the second bitstream becomes possible. Since the first bitstream may use up the available bit budget, the second bitstream may not exist for the access unit. If the second bitstream exists for the access unit, the second bitstream 612 is decoded by error plane decoding unit 650 to derive the reconstructed residual data 651. The reconstructed residual data 651 is then added to the first reconstructed data 621 by adder 630 to generate decoded data, which is shown as reconstructed access unit 640 in FIG. 6. If the second bitstream does not exist, the first reconstructed data 621 is used as the reconstructed access unit 640.

Figure 7:
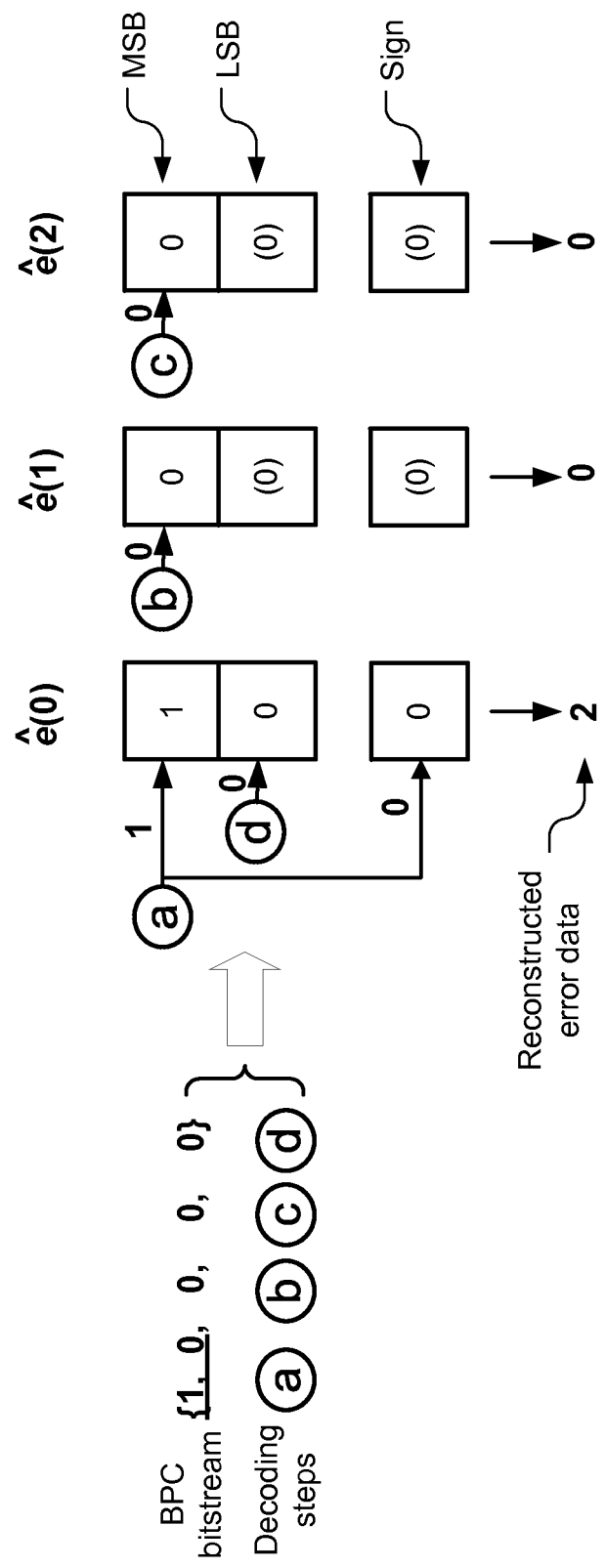
FIG. 7 illustrates an example of bit-plane coding and decoding instance according to the present invention.

FIG. 7 illustrates an example of EPC decoding process for the BPC bitstream corresponding to FIG. 5B. Bit plane decoding is a reverse process of the bit plane encoding. One embodiment according to the present invention is to decode the bit-plane coded residual data from MSB to LSB of the magnitude. The bit after the first non-zero magnitude bit of each sample is the sign bit associated with the error sample being decoded. The second bitstream resulted from the example of FIG. 5B, i.e., {1, 0, 0, 0, 0} is used to reconstruct the residual errors, ê(0), ê(1), and ê(2). The bits in the second bitstream are assigned to bit positions of the reconstructed data from MSB to LSB in the bit plane fashion. The bit following the first "1" bit for each sample is interpreted as a sign bit. Accordingly, the first "1" bit and the following bit (i.e., "0") are assigned to the bit positions corresponding to the MSB and the sign bit of the first data as shown in step a. The next bit (i.e., "0") is assigned to the bit position corresponding to the MSB of the second sample as shown in step b. The further next bit (i.e., "0") is assigned to the bit position corresponding to the MSB of the third sample as shown in step c. The last bit (i.e., "0") is assigned to the bit position corresponding to the LSB of the first sample as shown in step d. After step d, there is no more bit available to assign to the reconstructed residual errors. These empty bit positions are filled with a default value, i.e., 0, shown as "(0)" in FIG. 7. Alternatively, the bit positions of the reconstructed residual data can be initialized with default values, such as all zeros and there is no need to fill the un-assigned bit positions. Accordingly, the reconstructed error data are {2, 0, 0}.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of data compression incorporating error plane coding according to the present invention as described above may be implemented in various hardware, software codes, or a combination of both. For example, an embodiment of the present invention can be implemented as one or multiple processor circuits or program codes integrated into image or video compression chips to perform the processing described herein. The DRAM memory may be external DRAM of the image or video compression chips, internal memory of these chips, or memory in other forms such as field programmable gate array (FPGA) internal storage. An embodiment of the present invention may also be integrated as program codes of image or video compression/decompression software to be executed in CPU or Digital Signal Processor (DSP) to perform the processing described herein. The invention may also involve a number of functions to be performed by a computer processor, a DSP, a microprocessor, or FPGA. These processors can be configured to perform particular tasks according to the invention, by executing machine-readable software code or firmware code that defines the particular methods embodied by the invention. The software code or firmware codes may be developed in different programming languages and different format or style. The software code may also be compiled on and cross-compiled for different platforms. However, different code formats, styles and languages of software codes and other means of configuring code to perform the tasks in accordance with the invention will not depart from the spirit and scope of the invention.

Embodiment of data compression according to the present invention as described above may be implemented in various hardware, software codes, or a combination of both. The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of image data compression for compressing frame or image buffer in an image or video coding system, the method comprising:
    receiving image data to be stored in the frame or image buffer, wherein the image data is partitioned into a plurality of access units;
    applying first data compression to each access unit to generate a first bitstream for the access unit, wherein size of the first bitstream is smaller than or equal to a target bit budget for the access unit;
    in response to result of the first data compression, applying second data compression to residual data of the access unit to generate a second bitstream for the access unit, wherein the residual data corresponds to first differences between original image data of the access unit and first reconstructed image data corresponding to the first data compression of the access unit;
    providing the first bitstream for storing in the frame or image buffer; and
    providing the second bitstream for storing in the frame or image buffer if the second bitstream exists.

2. The method of claim 1, wherein said applying the second data compression to the residual data of the access unit is skipped if the size of the first bitstream is equal to the target bit budget.

3. The method of claim 1, wherein said applying the second data compression to the residual data of the access unit is skipped if the first data compression results in lossless compression.

4. The method of claim 1, wherein the second data compression comprises bit-plane coding applied to bit plane-ordered data, wherein the bit plane-ordered data is generated by scanning from a most significant bit to a least significant bit of the residual data in a bit plane-wise order.

5. The method of claim 4, wherein the second data compression further comprises error data preprocessing before said bit-plane coding.

6. The method of claim 5, wherein said error data preprocessing comprises data clipping, data quantization, data filtering, data rounding or any combination thereof.

7. The method of claim 4, wherein each sample of the residual data is represented by sign and magnitude, wherein the sign is represented by one sign bit and the magnitude is represented by one or more magnitude bits.

8. The method of claim 7, wherein, if said one or more magnitude bits contain one "1" bit, the sign bit is inserted after a first "1" bit of said one or more magnitude bits corresponding to the sample, and wherein said one or more magnitude bits with inserted sign bit is used as a binary representation for the sample; and otherwise said one or more magnitude bits corresponding to the sample is used as the binary representation for the sample.

9. The method of claim 4, wherein first N bits of the bit plane-ordered data is used as the second bitstream, and wherein N is an integer corresponding to a second difference between the size of the first bitstream and the target bit budget for the access unit.

10. The method of claim 9, wherein the bit plane-ordered data beyond the first N bits is discarded.

11. The method of claim 1, wherein the second bitstream of the access unit is appended to the first bitstream of the access unit.

12. The method of claim 1, wherein the first reconstructed image data for the access unit is generated by decoding the first bitstream of the access unit using first data decompression.

13. A method of image data decompression for decompressing frame or image buffer in an image or video coding system, the method comprising:
receiving a bitstream associated with an access unit of an image from the frame or image buffer, wherein the bitstream comprises a first bitstream, and wherein the bitstream further comprises a second bitstream according to a condition of the first bitstream;
decoding the first bitstream using first data decompression to generate first reconstructed data corresponding to the access unit;
decoding the second bitstream using second data decompression to generate second reconstructed data if the second bitstream exists, wherein the second reconstructed data corresponds to residual data which corresponds to differences between original image data of the access unit and the first reconstructed data of the access unit;
combining the first reconstructed data and the second reconstructed data to generate final reconstructed data for the access unit if the second bitstream exists; and
otherwise, using the first reconstructed data as the final reconstructed data for the access unit; and
providing the final reconstructed data for the access unit of the image or video coding system.

14. The method of claim 13, wherein a total size of the first bitstream is smaller than or equal to a target bit budget of the access unit.

15. The method of claim 13, wherein the condition corresponds to a case that the first bitstream is smaller than a known bit budget for the access unit.

16. The method of claim 13, wherein said combining the first reconstructed data and the second reconstructed data corresponds to summing the first reconstructed data and the second reconstructed data.

17. The method of claim 13, wherein the second data decompression corresponds to bit-plane decoding, and wherein said bit-plane decoding decompresses the second bitstream by assigning the second bitstream to the second reconstructed data from a most significant bit to a least significant bit in a bit plane-wise order.

18. The method of claim 17, wherein one or more bit positions of the second reconstructed data without an assigned bit are assigned a default value.

19. The method of claim 17, wherein, if a "1" bit is first time assigned to a sample of the second reconstructed data, a bit of the second reconstructed data after the "1" bit is assigned to a sign bit of the sample.

20. The method of claim 13, wherein the first data decompression determines size of the first bitstream after decoding the first bitstream.

21. An apparatus for image data compression, the apparatus comprising:
one or more circuits, wherein said one or more circuits are configured to:
to receive image data, wherein the image data is partitioned into a plurality of access units;
to apply first data compression to each access unit to generate a first bitstream for the access unit, wherein size of the first bitstream is smaller than or equal to a target bit budget for the access unit;
in response to result of the first data compression, to apply second data compression to residual data of the access unit to generate a second bitstream for the access unit, wherein the residual data corresponds to first differences between original image data of the access unit and first reconstructed image data corresponding to the first data compression of the access unit;
to provide the first bitstream; and
to provide the second bitstream if the second bitstream exists.

22. An apparatus for image data decompression, the apparatus comprising:
one or more circuits, wherein said one or more circuits are configured to:
to receive a bitstream associated with an access unit of an image, wherein the bitstream comprises a first bitstream, and wherein the bitstream further comprises a second bitstream according to a condition of the first bitstream;
to decode the first bitstream using first data decompression to generate first reconstructed data corresponding to the access unit;
to decode the second bitstream using second data decompression to generate second reconstructed data if the second bitstream exists, wherein the second reconstructed data corresponds to residual data which corresponds to differences between original image data of the access unit and the first reconstructed data of the access unit;

to combine the first reconstructed data and the second reconstructed data to generate final reconstructed data for the access unit if the second bitstream exists; and otherwise, to use the first reconstructed data as the final reconstructed data for the access unit; and to provide the final reconstructed data for the access unit.

23. The apparatus of claim 22, wherein a total size of the first bitstream is smaller than or equal to a target bit budget of the access unit.

\* \* \* \* \*